(12) United States Patent
Gumaer

(10) Patent No.: US 12,394,967 B2
(45) Date of Patent: Aug. 19, 2025

(54) HIGH DENSITY MULTI-POSITION NETWORK TERMINATION ASSEMBLY AND PROCESS OF MANUFACTURE

(71) Applicant: Lennard A. Gumaer, Bloomfield Hills, MI (US)

(72) Inventor: Lennard A. Gumaer, Bloomfield Hills, MI (US)

( * ) Notice: Subject to any disclaimer, the term of this patent is extended or adjusted under 35 U.S.C. 154(b) by 359 days.

(21) Appl. No.: 17/698,872

(22) Filed: Mar. 18, 2022

(65) Prior Publication Data
US 2022/0302693 A1  Sep. 22, 2022

Related U.S. Application Data

(60) Provisional application No. 63/162,526, filed on Mar. 18, 2021.

(51) Int. Cl.
| | |
|---|---|
| *H02G 15/064* | (2006.01) |
| *H01R 13/58* | (2006.01) |
| *H01R 13/518* | (2006.01) |
| *H01R 24/64* | (2011.01) |

(52) U.S. Cl.
CPC ....... *H02G 15/064* (2013.01); *H01R 13/5804* (2013.01); *H01R 13/518* (2013.01); *H01R 24/64* (2013.01); *H01R 2201/04* (2013.01)

(58) Field of Classification Search
None
See application file for complete search history.

(56) References Cited

U.S. PATENT DOCUMENTS

| | | | | |
|---|---|---|---|---|
| 3,086,074 A | * | 4/1963 | Just | H01R 13/41 174/148 |
| 3,213,406 A | * | 10/1965 | Just | H01R 13/6453 439/681 |
| 5,149,277 A | * | 9/1992 | LeMaster | H02G 3/283 439/502 |
| 5,586,012 A | * | 12/1996 | Lerman | H04Q 1/08 361/825 |
| 6,442,017 B1 | * | 8/2002 | Ewing | G06F 1/189 361/628 |
| 6,654,460 B1 | * | 11/2003 | Rodgers | H04Q 1/09 379/326 |
| 7,964,804 B2 | * | 6/2011 | Kaplan | H02G 3/0431 174/101 |

(Continued)

FOREIGN PATENT DOCUMENTS

| | | | | |
|---|---|---|---|---|
| EP | 795935 A2 | * | 9/1997 | ......... H01R 13/5804 |
| EP | 0778711 A2 | * | 11/1997 | |

*Primary Examiner* — Krystal Robinson
(74) *Attorney, Agent, or Firm* — Craig A. Phillips; Dickinson Wright PLLC

(57) ABSTRACT

A high-density network termination assembly, mountable in multiple orientations such as in equipment cabinets, in equipment racks or on walls, that provides identified termination points and physical cable management to maintain bend radius requirements for multiple twisted pair Ethernet cables, fiber cables, and other types of signal and communication cables in a small space using commercially available snap-in couplers. The termination assembly also provides one or more optional corrosion-resistant landing points for equipment grounding conductors to be affixed for compliance with industry standard equipotential grounding practices.

20 Claims, 9 Drawing Sheets

(56) References Cited

U.S. PATENT DOCUMENTS

| | | | |
|---|---|---|---|
| 2006/0011380 A1* | 1/2006 | Pierce | H02G 3/32 |
| | | | 174/135 |
| 2006/0171075 A1* | 8/2006 | Caveney | H01R 9/2416 |
| | | | 360/234.3 |
| 2007/0082522 A1* | 4/2007 | Bonvallat | H04Q 1/142 |
| | | | 439/165 |
| 2008/0237408 A1* | 10/2008 | McClellan | H04Q 1/06 |
| | | | 248/68.1 |
| 2009/0014210 A1* | 1/2009 | Forbis | H02G 3/32 |
| | | | 361/825 |
| 2009/0038845 A1* | 2/2009 | Fransen | H04Q 1/021 |
| | | | 174/72 R |
| 2009/0179116 A1* | 7/2009 | St-Louis | G02B 6/4452 |
| | | | 248/68.1 |
| 2012/0228002 A1* | 9/2012 | Li | H02G 3/26 |
| | | | 174/135 |

\* cited by examiner

HIGH DENSITY MULTI-POSITION NETWORK TERMINATION ASSEMBLY AND PROCESS OF MANUFACTURE

CROSS-REFERENCE TO RELATED APPLICATION

This application claims the benefit of U.S. Provisional Application Ser. No. 63/162,526, filed on Mar. 18, 2021, which is incorporated herein by way of reference in its entirety.

BACKGROUND OF THE INVENTION

1. Field of the Invention

A high-density electromechanical cable termination assembly that provides a concentrated termination point for multiple communications and network cables in a comparatively small space intended for surface mounting in proximity of first responder dispatch workstations and in similar mission-critical settings.

2. Description of Prior Art

While the present invention will be discussed in the context of first responder communications and command applications, such as police, fire and emergency medical dispatch centers, the present invention could be used in other fields as well, particularly for fiber cables and the routing thereof, and any mention of the use of first responder communications applications or dispatch configuration in the discussion of how the invention may be used should not be considered limiting.

The general public and first responders such as police, firefighters, medics, military and other personnel depend upon reliable communications with the regional dispatch center serving their jurisdiction or geographic area.

First responder dispatch centers as recently as a decade or two ago may have only had a simple telephone switchboard, a radio microphone and speaker, and something to document each incident call or transmission, e. g. a paper log book.

Communications technologies have rapidly advanced and evolved in recent years, and modern dispatch centers have highly sophisticated computerized phone, radio, Computer Aided Dispatch (CAD) systems, and other types of systems that make reliable 911 call processing and incident dispatching possible. With the advent of text messaging and streaming video from smart cellular phones, additional methods of contacting 911 services and communicating with field operations are developing.

Each of these communications systems, while largely integrated and implemented as an interconnected solution, requires a substantial amount of computer and networking equipment to reliably provide services. Different systems have different types of user interfaces, microphone and speaker devices, headsets, recording devices, and data access units like keyboards, mice, touch screens and the like. This presents a cabling organization challenge.

Because of the unique requirements of the individual systems, and the need for dispatch and communications personnel to multi-task, many network connections must be provided at the dispatcher workstation positions. Multiple PC or Macintosh computers, thin clients, text terminals, and other devices are commonly located at the dispatcher workstation position and require network connections to the appropriate network-provided resources needed by that particular device or service.

As the complexity of services has increased, the amount of equipment located at the dispatch workstation position has also increased, as has the cabling required to interconnect the position equipment with back-room servers and other equipment. There is frequently a need to provide ten or more network connections at each dispatch position workstation, and sometimes many more connections.

In the past, almost all of the dispatch equipment had its own AC or DC power supplies, and power was provided to the equipment separately from the network or signaling connections. Even though many items of equipment still have their own power supply, increasingly, modern dispatch equipment is powered over the same cabling as the network connections, using an industry-standard platform called Power Over Ethernet (POE).

The evolving use of network cabling to provide power to the device it connects, new consideration must be given to heating of the individual conductors in the cable. As connected device power requirements increase, ever greater power supply current flows in the network cable, resulting in increased heating of the individual cables due to resistive losses in the individual conductors.

Another challenge presented by the wide variety of individual systems present in a typical dispatch center is the involvement of many different vendors over a long time period, and ongoing addition and removal of equipment. This frequently gives rise to severe cabling and termination box clutter under the dispatch workstation position furniture or nearby equipment cabinet. With three or more individual systems co-existing in the same desktop space, there can be a tremendous number, if not hundreds, of network cables, power cords, power supplies, network termination boxes tangled at the dispatch position, and not mention abandoned cabling of multiple types that may be present.

Commercially available network termination boxes typically accommodate twelve or fewer ports, commonly six or fewer. This limitation leads to multiple termination boxes being added to accommodate larger numbers of cables. Similarly, as future expansion occurs, additional boxes are frequently added by new vendors, causing high installation costs as more boxes are added.

In addition, accurate human-readable cable identification is imperative to simplify maintenance activities, reduce adverse downtime, and prevent inadvertent network disconnections. Existing commercially available network termination boxes or plates rely on handwritten or field printed and applied labels. Labels written in permanent ink often are not updated and may provide harmfully misleading information to a maintenance technician. Termination boxes that use numeric-only identification of ports rely on site drawings or reference lookup tables for a technician to determine the identity of a port and the network resource it interconnects. These reference tables are often outdated or impossible to locate quickly in an emergency. Improper labeled cables lead to data loss, operational failure and even injury to workers.

Another problem occurs with fiber cables, especially when routing fiber cables to the final termination point. Many times the fiber cables over time, or when people pull on other cables that move the subject cable, get bent more than the desired radius, which may cause a loss of data in the fiber cable. As such, there is a a great need to prevent loss of date or outages due to cables that get misaligned or bent beyond their desired specifications.

SUMMARY OF THE INVENTION

The present invention provides a strong, stable platform in which to route and secure individual cables, while allowing for easy serviceability. The unique nature of the present invention avoids requiring lengthy cable service loops, and provides a self-exemplary guide for orderly future expandability. The present invention also provides a permanent port identification mechanism via a custom user-defined escutcheon plate. The plate can be updated as network configurations change and cable terminations are added or removed.

The present invention improves physical cable bundling, organization, and routing and is configured to reduce thermal effects of cable heating, or minimize the bend radius of any fiber cable to prevent data loss. With regard to cable heating, it can occur particularly when large numbers of POE cables are used. Minimizing cable length, excess service loops at network termination points, and improved routing of cables is desirable and reduces less heat dissipation in the network link itself, or for fiber cables data loss is minimized. In addition, proper cable management also reduces costs because it minimizes the amount of cable used in the total cabling system.

Key to addressing these challenges and enhancing network performance and minimizing negative thermal effects associated with POE-powered network devices, or fiber cabling data loss, with the present invention is the careful organization and management of cables throughout the entire cable path from equipment room to dispatch position and then proper placement in the device.

The present invention may be surface mounted in multiple orientations within a desk-side equipment cabinet, on either the left or right side of the cabinet interior walls, or on the underside of the cabinet top. The present invention may also be mounted in an equipment rack in a vertical, horizontal or other configurations, allowing the feeding cables to be bundled into a parallel column originating from the ceiling or overhead cable trays, or from the floor, from under-floor cable management trays.

The present invention also provides multiple options for connecting an equipment grounding conductor in order to provide a safe equipotential zone for humans interacting with the termination assembly and to comply with various industry standards and regulations.

More specifically the present invention is directed to a cable termination assembly for aligning and terminating a plurality of cables, said cable termination assembly including a base plate having a cable securing portion and a termination portion angled relative to the cable securing portion and wherein the cable securing portion includes a plurality of cable securing rungs and the termination portion includes a plurality of holes.

The cable termination assembly includes plurality of cable securing rungs forming both a first group of cable securing rungs and a second group of cable securing rungs and wherein the first group includes at least one cable securing rung having a first axis along its longitudinal axis, and the second group includes at least one cable securing rung having a second axis along its longitudinal axis and wherein the first and second axes are substantially perpendicular to each other. As used herein, substantially perpendicular means predominantly perpendicular, allow for manufacturing or other deviations from perpendicular. In some instances, the rungs may be angled relative to each other depending on cable placement.

The cable securing rungs also define a strap passage in connection with the base plate. More specifically, the cable securing rungs include a lower portion and an upper portion wherein the upper portion and the lower portion define the strap passage and wherein the lower portion is coupled to the base plate. A strap passing through the strap passage generally passes through the strap passage substantially perpendicular to the longitudinal axis of the cable securing rung.

The first group of cable rungs includes at least one cable securing rung for every six holes and the second group of cable rungs includes at least one cable securing rung for every three cable securing rungs in the first group. However, depending on cable sizes or arrangement, this could be less, such as at least one cable securing rung in the second group is larger than at least one cable securing rung in the first group. As illustrated in the Figures, the holes may extend vertically as well as horizontally, and at least one or more vertical holes arranged above each hole of the first horizontal row of holes. As such the first group of cable rungs may include at least one cable securing rung for every four holes and the second group of cable rungs includes at least one cable securing rung for every two cable securing rungs in the first group. And even more specifically, the first group of cable rungs may include at least one cable securing rung for every adjacent pair of holes in the first row of holes and the second group of cable rungs includes at least one cable securing rung for every two cable securing rungs in the first group, and wherein the number of vertical holes arranged about the adjacent pair of holes does not change the number of cable securing rungs in the first group, as smaller bundles of cables may be stacked above each cable securing rung and individually secured to each cable securing rung.

The cable termination assembly also arranges the first group of cable securing rungs is in an orientation with their long dimension axis perpendicular to the termination portion, or more specifically the plane or axis of the termination portion of said base plate in order to establish the first of two cable bending radius arc points.

The second group of cable securing rungs is oriented with their long dimensional axis parallel to the termination portion of the base plate and substantially perpendicular to the long dimension axis of the first group of cable securing rungs. The second group of cable securing rungs is oriented to establish a second cable bending radius arc point.

The cable termination assembly further includes the positioning of each of the cable securing rung relative to a group of holes on the termination portion and is configured to minimize any bending in the cables extending from the holes to the relative cable securing rung, and any bends in the cable's direction occur after each of the cable securing rung in the first group.

The cable termination assembly if further configured such that each of the cable securing rungs in the first group of cable securing rungs is configured relative to the holes and each subsequent cable securing rung in the second group of cable securing rungs to minimize any bends in the cable between the respective hole in the termination portion and the cable securing rungs in the first group and form the bend in the cable between the first group of cable securing rungs and the second group of cable securing rungs.

The cable termination assembly may also include a grounding attachment tab coupled to the base plate.

BRIEF DESCRIPTION OF THE DRAWINGS

These and other aspects, features and advantages of the invention will become readily apparent when considered in connection with the following detailed description of presently preferred embodiments and best mode, appended claims and accompanying drawings, in which:

DETAILED DESCRIPTION OF THE PREFERRED EMBODIMENTS

Figure 1:
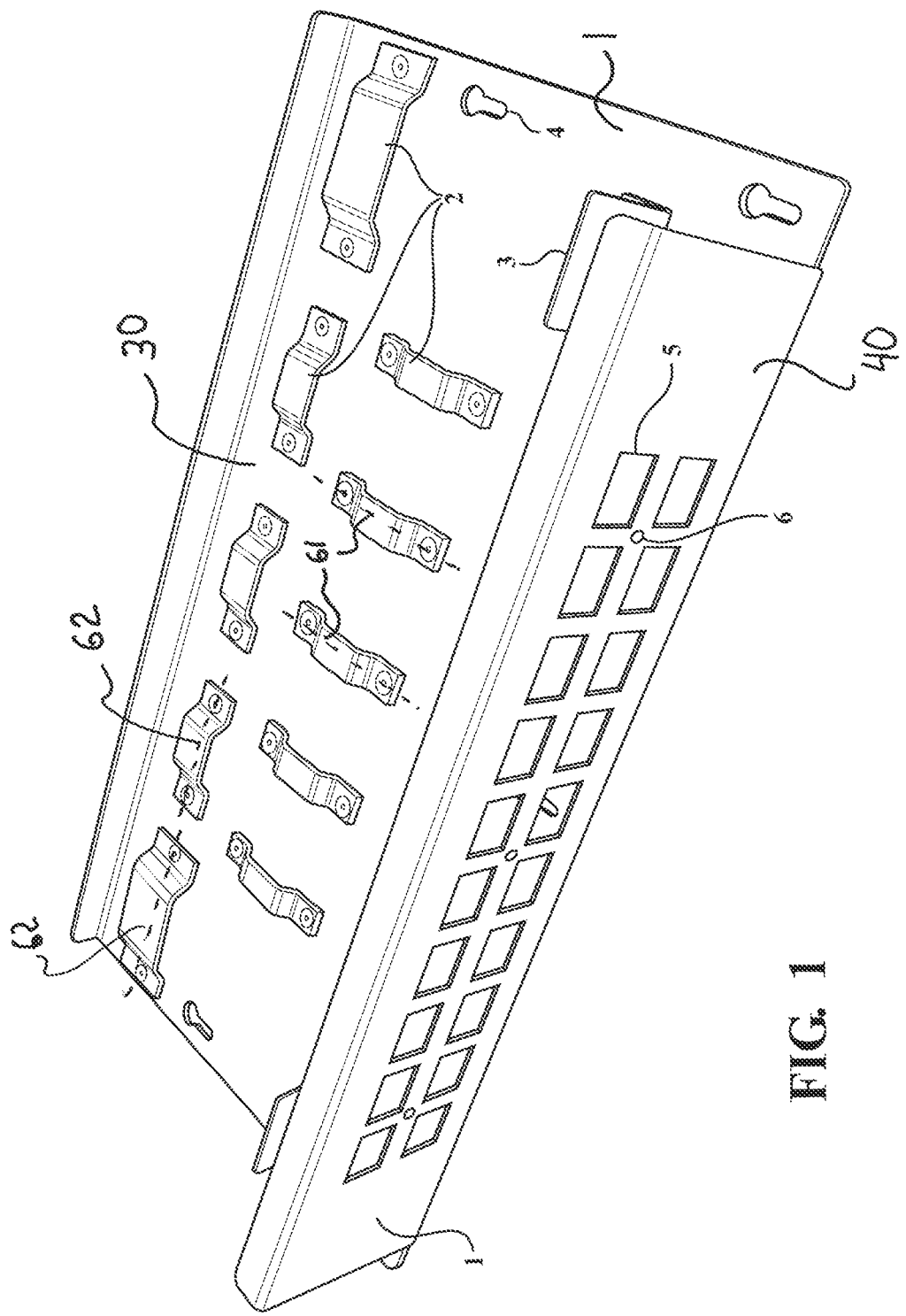
FIG. 1 is a top front perspective view of the cable termination assembly, without front panel escutcheon plate, and removed from any outer shell or support rack system.

The present invention is directed to a cable termination assembly 99 depicted in the Figures as generally including a base plate 1 having cable securing portion 30 and a termination portion 40. The cable securing portion 30 includes a plurality of cable securing rungs 2, positioned to assist with organization of the cables 10. The termination portion 40 extends at an angle from, typically perpendicular to, the cable securing portion 30. While the cable securing portion 30 can be formed separate from and coupled to the termination portion 40, the base plate 1 is typically formed by bending steel, such as with a press brake, or by stamping, into the illustrated three-dimensional shape. While the base plate may be formed from injected plastic or the like, or a variety of other materials, it has been found that forming the base plate 1 from metal, typically a mild steel for manufacturing ease and cost savings is preferable, as the base plate 1 may act as a heat sink transferring heat away from the cables 10.

The termination portion 40 of the base plate 1 defines a plurality of holes 5. These holes are generally industry standard sized to allow snap in of the desired connector, such as the illustrated cable coupler 8. More specifically, forming the base material from the steel allows the base plate 1 formed to a desired shape and punched or laser-cut with holes 5, keyholes 4 and any other desired configurations, as well as threaded inserts into the material. The base plate 1 may accept commercially available snap-in cable couplers 8 and permit surface mounting with mounting fasteners through keyhole mounting holes 4. The cable securing rungs 2, may also formed by a plate pressing operation, are as illustrated resistance spot welded 14 to the base plate 1. Of course the rungs 2 may also be displacement-punched from the base plate 1, or externally produced from steel or other materials and secured separately to the base plate 1.

Figure 8:
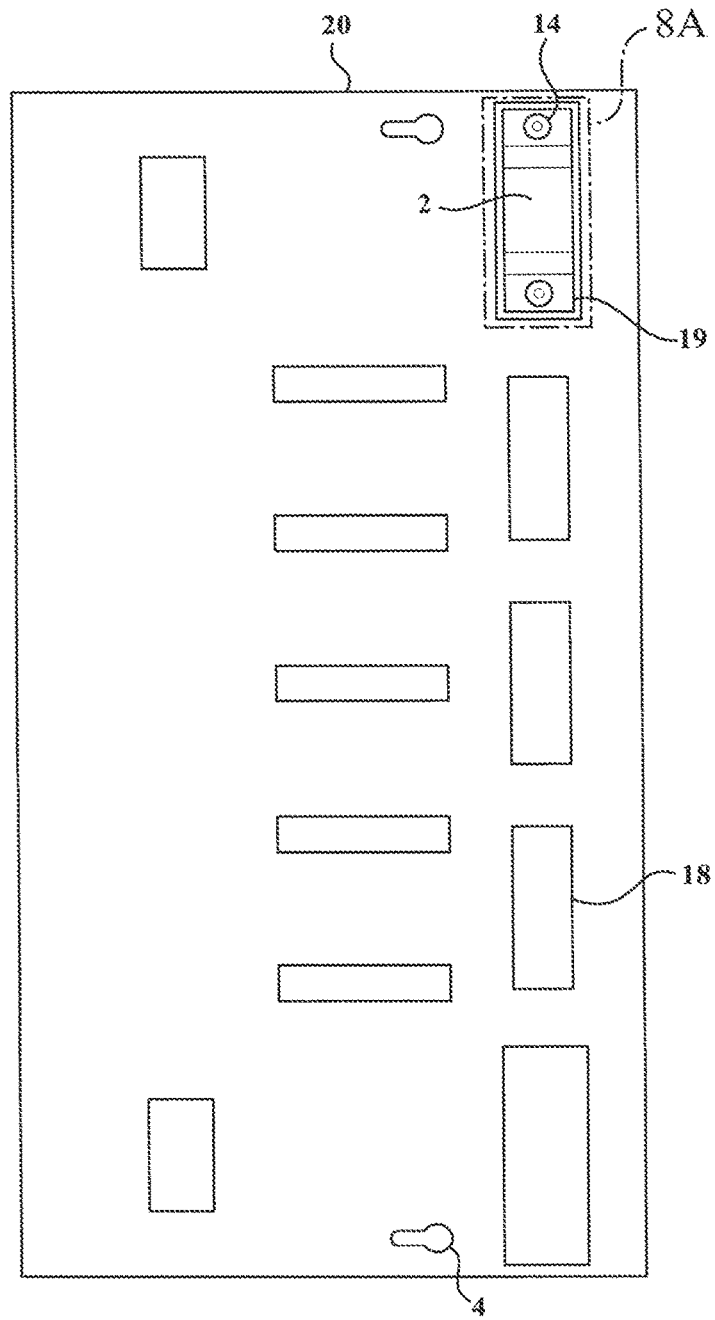
FIG. 8 illustrates a top view of an exemplary template used for positioning cable securing rungs for resistance spot welding.

The rungs 2, shown in detail in FIG. 8, contain multiple bends to produce an offset to permit self-fastening cable securing straps 11 to easily pass between the rung 2 and the base plate 1. The rungs may also vary in width, with smaller widths used with smaller bundles 50 of cables 10, and larger widths used with large bundles 52 of cables 10. The open offset area of the rung may also vary in length to accommodate narrower or wider self-fastening cable securing straps 11.

Figure 2A:
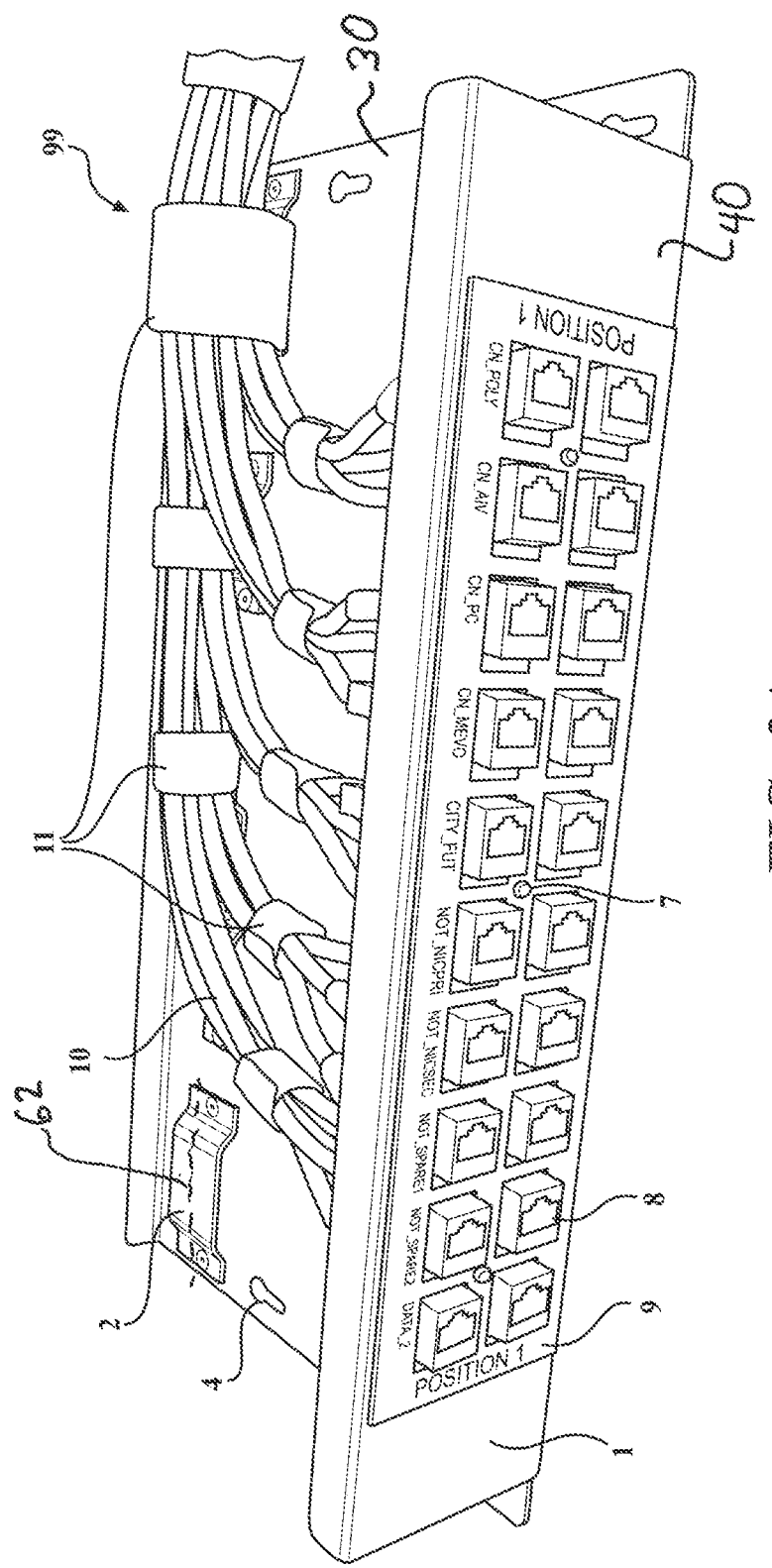
FIG. 2A is a front perspective view of the cable termination assembly with exemplary industry-standard twisted-pair Ethernet cables terminated to exemplary industry-standard snap-in RJ45 modular couplers and secured to cable management rungs to show context related to the cable termination assembly.
Figure 2B:
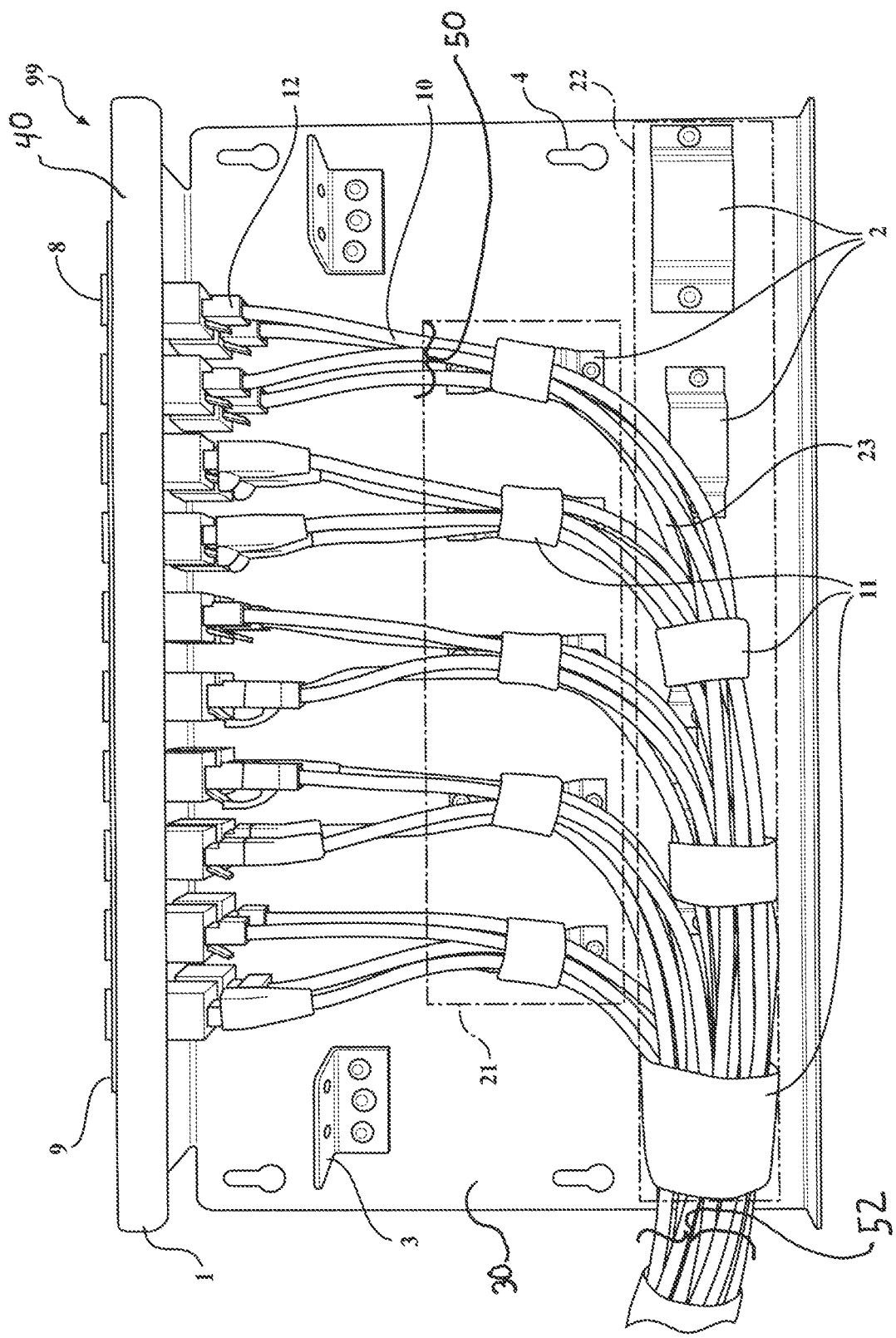
FIG. 2B is a top view of the cable termination assembly of FIG. 2A, including the exemplary connectors and cables.
Figure 7:
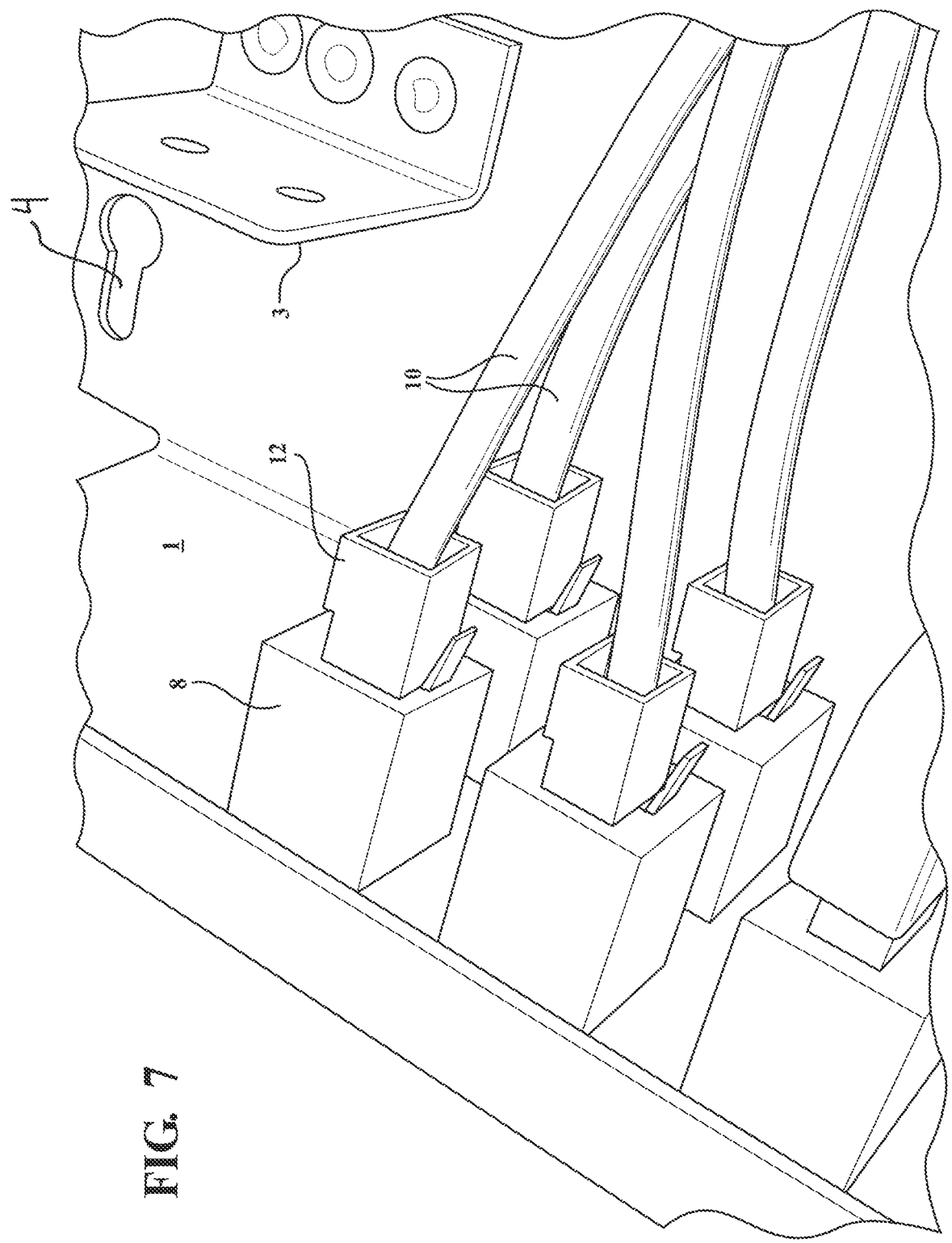
FIG. 7 is an enlarged partial rear perspective view of the cable termination assembly, including exemplary ports and commercially available snap-in couplers coupled to the cable termination assembly.

As described above, the termination portion 40, typically acting as a front panel of the cable termination assembly 99 is punched with multiple holes 5 as shown in FIG. 1, often rectangular, but may be of any geometry, in order to facilitate mounting of commercially available snap-in cable couplers 8 (illustrated in FIGS. 2A, 2B and 7 in the holes 5). Of course, cable couplers 8 may also employ a threaded body and nut for panel mounting or other method of securing. Each hole 5 and its installed termination coupler 8 represents one cable termination port. The exemplary termination portion 40 depicted in FIGS. 1, 2A, and 2B includes twenty ports. Of course other port counts are possible and the depicted twenty port example should not be interpreted as limiting. Also more rows of holes 5, or a single row, having a varied length with more or less holes 5 is possible.

The termination portion 40 acting as a front panel has hole 5 spacing configured to allow placing as many ports side-by-side and above each other as possible while still allowing safe finger access to mate and un-mate various connector types present on commonly used network cables. For example, the industry-standard RJ45 modular crimp plug 12 used for twisted-pair Ethernet cabling 10 has a spring-loaded locking tab that must be manually depressed in order to un-mate the connector 12 from the port coupler 8. The spacing for these RJ45 connectors may differ from the spacing used for other connectors. Although not illustrated, the holes can be shaped differently to accommodate fiber termination points when the termination assembly is being used for fiber cables. The termination assembly is even more valuable at preventing issues with fiber cables.

Figure 8A:
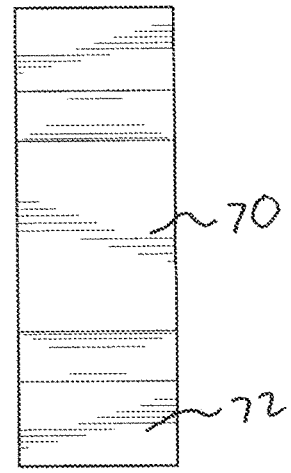
FIG. 8A illustrates a top view of a cable securing rung.
Figure 8B:
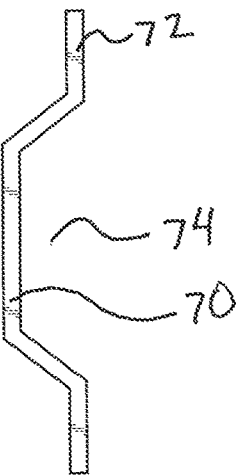
FIG. 8B illustrates a view of the cable securing rung.
Figure 8C:
FIG. 8C illustrates a side view of the cable securing rung.

As discussed above, cable securing rungs 2, as depicted in FIG. 2B, are included, molded to, coupled to or more preferably welded to the cable securing portion 30 of the base plate 1. The cable securing rungs, as illustrated in FIGS. 8A and 8B include an upper portion 70 and a lower portion 72, wherein the upper portion 70 and the cable securing portion 30 of the base plate 1 cooperatively define a strap passage 74.

As illustrated in FIG. 1 and FIGS. 2A and 2B, the cable securing rungs 2 are positioned in two groups on the base plate 1 to allow orderly grouping of several terminated cables 10 together, providing strain-relief and inadvertent pull-out resistance to the connectors 8 detaching inadvertently from the holes 5. The first group 21 of cable securing rungs 2 is oriented with their long dimension axis 61 perpendicular to the front panel in order to establish the first of two cable bending radius 23 arc points. This positioning is critical to align the cables 10 with the holes 5, to prevent the connectors 12 from become detached from the couplers 8, as well as the couplers 8 from becoming detached from the holes 5. As illustrated, the arrangement of the rungs 2 allows for a substantially straight run of cable in individual bundles to a set of holes 5. As illustrated in FIG. 2B, the cables 10 are bundled into groups of four, although more or less could be bundled together. For cable termination assemblies 99 with a tall stack of holes 5 extending from the cable securing portion, multiple cable fastener straps 11, such as the illustrated self-engaging fastener straps may allow individual bundles to be stacked vertically and the multiple fastener straps 11 to be coupled to the same cable fastening rung 2.

The second group of rungs 22 is oriented with their long dimension axis 62 parallel to the front panel 40 and establishes the second of the two cable bending radius 23 arc points, preventing bending any terminated cable more tightly than established industry best practices. It is important that this second group of rungs is angled relative to the first group of rungs 21, typically perpendicular.

Figure 3:
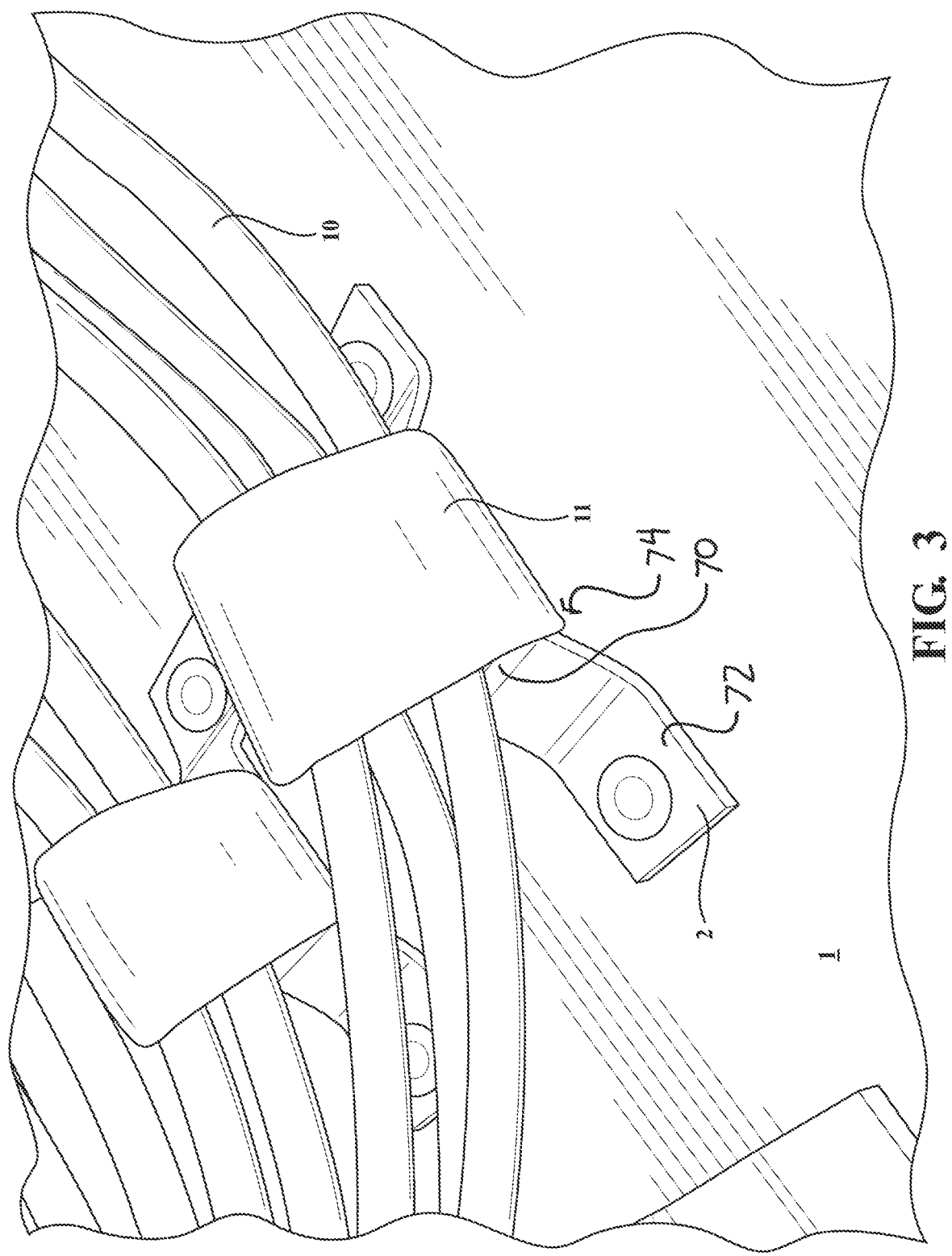
FIG. 3 is an enlarged partial top perspective view of the cable termination assembly showing the exemplary cables, management rungs and self-engaging flexible fastening straps for securing industry-standard network cables to the cable management rungs.

As discussed above, the cable termination assembly 99 uses cable fastening straps 11 to secure the cables 10 in the proper positions and couple them to the cable securing portion 30 of the base plate 1. As illustrated in FIGS. 2A and 2B and FIG. 3 the cable termination assembly 99 is furnished with self-engaging cloth fastener straps 11 of sufficient length to encircle the grouped conductors 10 without excess strap material. Self-engaging cloth fastener straps 11, particularly of the industry-standard hook and loop style, are industry preferred as they avoid mechanical damage to the cables 10 that can occur with conventional nylon or plastic ratcheting cable ties. Further, the cloth is soft to the touch and does not present skin abrasion and cut injury risk posed by improperly trimmed cable tie tails. Of course other cable fastening methods and devices may be used.

Figure 4:
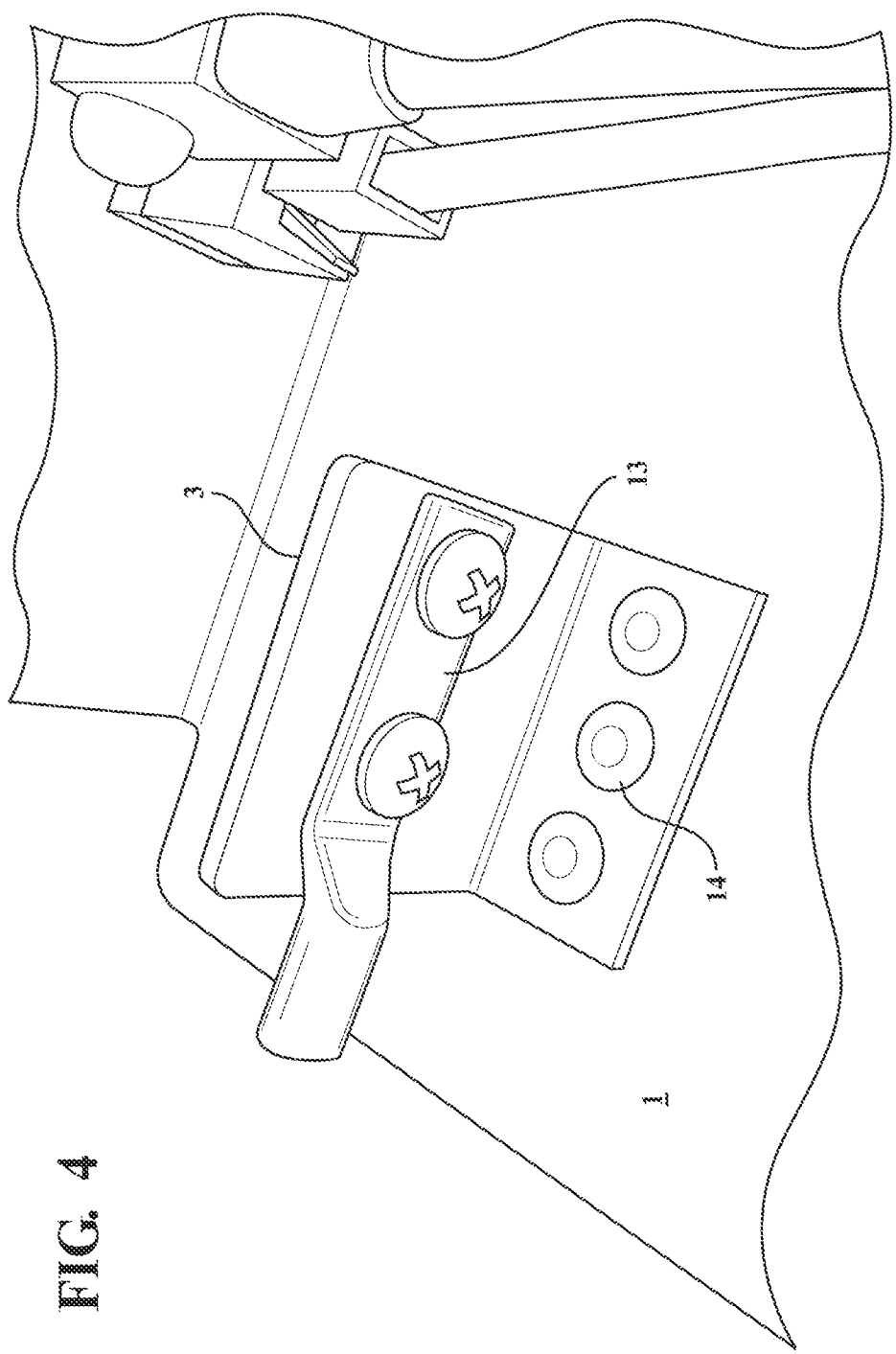
FIG. 4 is an enlarged partial rear perspective view of attachment tabs such as corrosion-resistant grounding conductor attachment tab and industry standard crimp-type cable connection lug secured with screws to the grounding conductor; also shown are exemplary cables and connectors attached to the cable termination assembly.

Two attachment tabs 3, as illustrated in FIG. 4 may be included on the base plate 1 to ground the base plate 1 to a grounding wire. Although not always required, it is advisable to ground the base plate 1 if POE cabling is used. The illustrated attachment tabs 3 are formed from corrosion-resistant materials, such as stainless steel, formed with a 90-degree angle and resistance spot welded 14 to the base plate 1, and are provided for secure attachment of a one or two hole grounding conductor lug 13. Grounding of all metallic objects in a dispatch workstation environment is required to protect the human operator from stray voltage potentials associated with lightning, power transients and electrostatic discharges.

Of course the attachment tabs 3 could be secured to the base plate 1 with fasteners, such as by coupling the attachment tabs 3 to a threaded hole or stud on the base plate 1. Other methods for securing the grounding lug may also be used, such as mechanically secured self-clinching threaded studs, welded threaded studs, or similar. Of course different configurations of the invention may provide fewer or greater than two grounding attachment tabs 3, or even a single attachment tab 3. In some embodiments, the attachment tabs 3 could be configured for other uses as well.

Unless formed out of stainless steel or a plastic non-corrosive material, all of the exposed surfaces on the base plate 1 subject to rust or corrosion are preferably finished with a coating, such as an environmentally-friendly powder paint coating, electroplating, or similar protection method to provide corrosion protection and produce an aesthetically appealing appearance. A portion of the grounding tab 3 in the area surrounding the ground lug 13 attachment holes should be left unprotected to ensure a clean electrically conductive surface to which the grounding lug connector 13 will mate. Choice of an inherently corrosion resistant metal, such as stainless steel, facilitates such a clean surface.

The front panel 40 of the base plate 1 as depicted in FIG. 2A also contains multiple mechanically inserted internally threaded fasteners 6 which accept screws 7, such as stainless steel screws 7 which secure an escutcheon plate 9 with identity information about the ports 15 and the termination assembly itself 16, as described in more detail below. Of course the escutcheon plate 9, depicted in FIG. 5, could be secured with other means such as an adhesive film, or the plate may be omitted and the identity information marked directly on the surface of the front panel of the base plate 1 itself.

Figure 5:
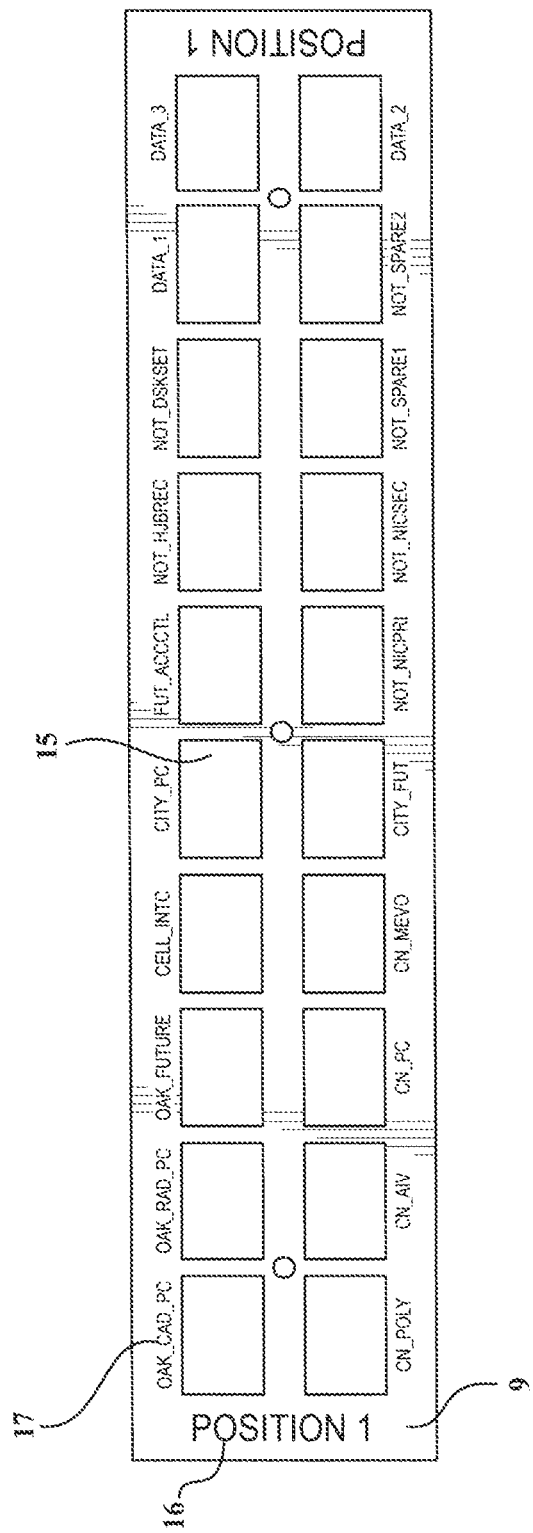
FIG. 5 is a front view of the cable termination assembly showing an exemplary front-panel escutcheon plate marked with identification information for the high-density termination assembly itself and each of the termination ports.

If included, the escutcheon plate 9 in FIG. 5 contains slightly oversized holes 15 of similar geometry as the holes 5 in the front panel of the base plate 1 to allow clearance for mounted couplers 8. These clearance holes may be mechanically punched, laser-cut, or formed via similar means.

An exemplary escutcheon plate 9 is shown in FIG. 5. The text identification of the termination assembly 16 is placed at the ends of the escutcheon plate 9, rendered in mirror duplicates so as to be readable regardless of plate orientation. Individual ports are identified with descriptive text 17 indicating port number, service name or type, cable color, or other information as specified by the end user. The exemplary plate 9 in FIG. 5 is marked by subtractive CNC machining or engraving. Of course other methods of marking could be employed, such as laser machining, stamping, or surface printing.

Typical dispatch communication centers are comprised of at least two, and sometimes many, individual workstation positions. The network port identifications may be the same for all positions in a center, or may differ, and each position is typically identified uniquely, often by number. Different centers may use completely unique nomenclature and naming conventions, requiring end-user customization.

Figure 6:
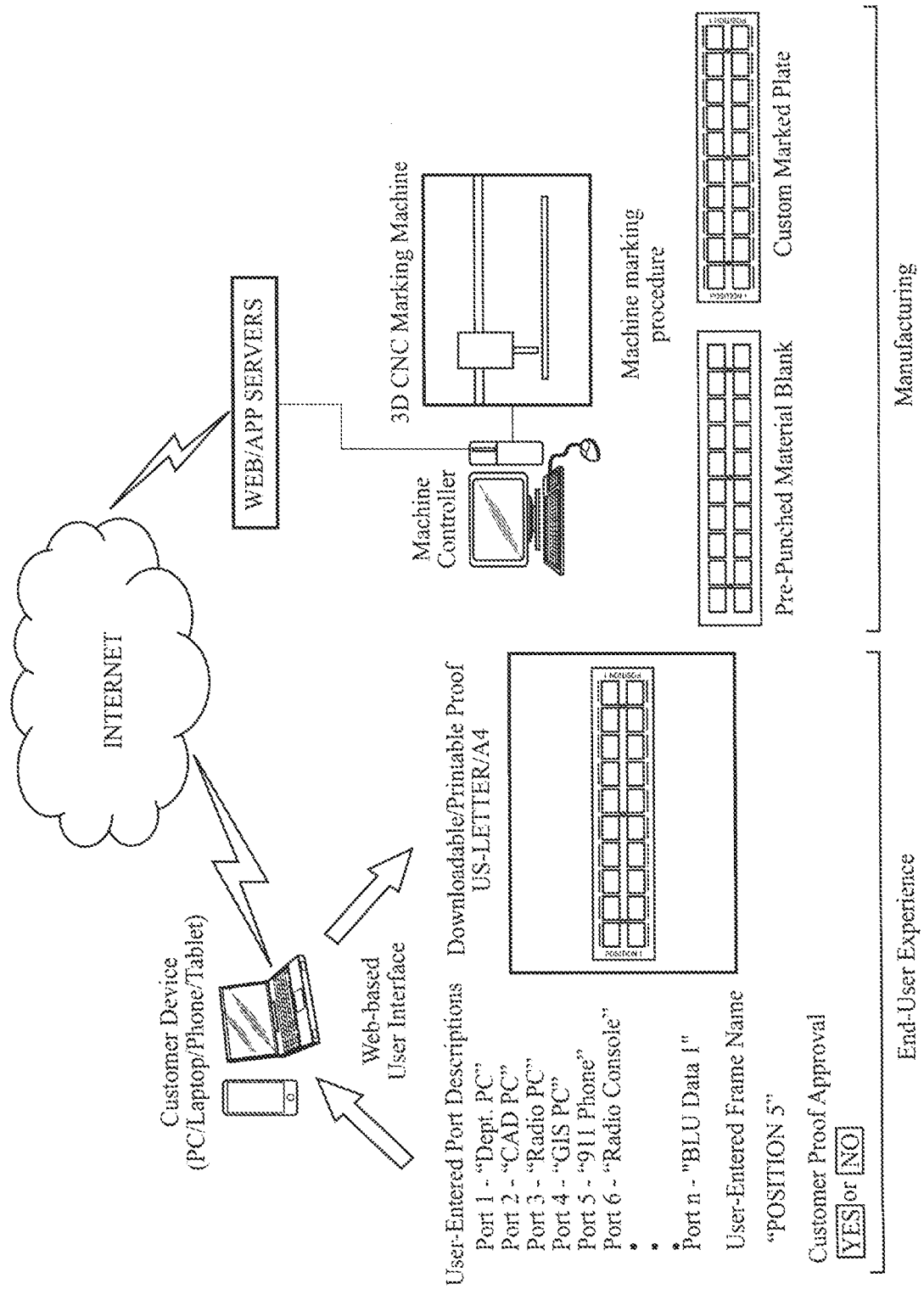
FIG. 6 is an exemplary logical workflow diagram for creating custom escutcheon plate using an end user web portal and interface to a CNC marking machine allowing rapid production of customized escutcheon plates.

The present invention provides a customization mechanism via a web portal, servers and software, and marking machinery. FIG. 6 depicts an exemplary solution where an end-user can enter a list of desired port identification texts and position-specific information for each dispatch position. Upon submitting user data to the web portal, servers process the information for the marking procedure.

A downloadable and printable actual size proof image is then generated by the web portal for end user approval prior to manufacturing. Once approved by the end user, the resultant image information is then used to mark a blank escutcheon plate with the custom markings prior to it being secured to the termination assembly base plate front panel.

Process of Manufacture

To facilitate low-volume, low-cost manufacturing, prototypes of the present invention were hand assembled and manually welded. To ensure accurate placement of the cable management rungs and grounding tabs, a laser-cut template 20 was employed. The template 20, formed from mild steel sheet, was laser cut with rectangular openings 18 slightly larger than the component pieces such as the securing rungs 2 and ground tabs 3 needing to be welded to base plate 1.

The template 20 was then temporarily secured to the base plate with locking welding pliers. Keyhole mounting holes 4 in the template serve as registration marks to ensure proper and repeatable alignment of the template 20 with the base plate 1. Once the template 20 is secured to the base plate 1, the individual cable management rungs 2 and grounding tabs 3 are placed on the base sheet in the slightly recessed wells formed by the cutouts 18 in the template.

A clearance margin 19 of a few thousandths of an inch between the template cutouts 18 and the components 2 and 3 to be welded allows the template 20 to be removed after welding. The clearance margin 19 also prevents weld spatter from inadvertently bonding the template 20 to the base plate 1. The individual components needing to be welded were held in place with manually-placed magnets before insertion into an electrical resistance spot welder machine. Of course more sophisticated clamping or temporary securing mechanisms could be employed in conjunction with the template 20 to reduce manual effort and expedite the component placement and welding procedure.

The welding machine included two copper electrode tongs that close against the bottom of the base plate 1 sheet and the top surface of the components 2 and 3 needing to be welded, and an electric current is energized for a pre-set interval to heat the materials at the weld point 14, resulting in a completed spot weld 14. This process is repeated until all the desired welds have been created. The template is then removed from the completed work piece.

Of course in volume manufacturing, certain manual steps could be enhanced or replaced with automated methods producing the same end result. For example, the cable management rungs 2 could be produced by offset punching from the base sheet. In this process, the rungs 2 would be part of the base metal 1 sheet and would not require separate fabrication and welding or attachment to the base sheet.

The invention claimed is:

1. A cable termination assembly for aligning and terminating a plurality of cables, said cable termination assembly comprising:
   a base plate having a cable securing portion and a termination portion angled relative to said cable securing portion and wherein said cable securing portion includes a plurality of cable securing rungs and wherein at least one of said plurality of cable securing rungs defines a strap passage wherein said strap passage is enclosed with an opening at each end and said termination portion includes a plurality of holes;
   wherein said plurality of cable securing rungs form a first group of cable securing rungs having a long dimension axis that is perpendicular to said termination portion, and a second group of cable securing rungs having a long dimension axis parallel to said termination portion; and
   wherein each of said first group of cable securing rungs is closer to said termination portion than said second group of cable securing rungs.

2. The cable termination assembly of claim 1, wherein said longitudinal axis of said first group of cable securing rungs is perpendicular to said longitudinal axis of said second group of cable securing rungs.

3. The cable termination assembly of claim 2, wherein said first group of cable rungs includes at least one cable securing rung for every six holes and said second group of cable rungs includes at least one cable securing rung for every three cable securing rungs in said first group.

4. The cable termination assembly of claim 3, wherein at least one cable securing rung in said second group is larger than at least one cable securing rung in said first group.

5. The cable termination assembly of claim 2, wherein said first group of cable rungs includes at least one cable securing rung for every four holes and said second group of cable rungs includes at least one cable securing rung for every two cable securing rungs in said first group.

6. The cable termination assembly of claim 2, wherein said first group of cable rungs includes at least one cable securing rung for every adjacent pair of holes in the first row of holes and said second group of cable rungs includes at least one cable securing rung for every two cable securing rungs in said first group, and wherein the number of vertical holes arranged about said adjacent pair of holes does not change the number of cable securing rungs in said first group.

7. The cable termination assembly of claim 2, wherein each of said cable securing rungs in said first group are arranged in parallel and each of said cable securing rungs in said second group are arranged in alignment along their longitudinal axis.

8. The cable termination assembly of claim 2, wherein said first group of cable securing rungs is oriented with their long dimension axis perpendicular to said termination portion of said base plate in order to establish a first cable bending radius arc points.

9. The cable termination assembly of claim 8, wherein the second group of cable securing rungs is oriented to establish a second cable bending radius arc point.

10. The cable termination assembly of claim 9, wherein the second group of cable securing rungs is oriented with their long dimensional axis parallel to said termination portion of said base plate and substantially perpendicular to said long dimension axis of said first group of cable securing rungs.

11. The cable termination assembly of claim 8, wherein the positioning of each of said cable securing rung relative to a group of holes on the termination portion is configured to minimize any bending in the cables extending from the holes to the relative cable securing rung, and any bends in the cable's direction occur after each of said cable securing rung in said first group.

12. The cable termination assembly of claim 2, wherein each of said cable securing rungs in said first group of cable securing rungs is configured relative to said holes and each subsequent cable securing rung in said second group of cable securing rungs to minimize any bends in the cable between the respective hole in the termination portion and the cable securing rungs in the first group and form the bend in the cable between the first group of cable securing rungs and the second group of cable securing rungs.

13. The cable termination assembly of claim 1, wherein said cable securing rungs define said strap passage in connection with said base plate.

14. The cable termination assembly of claim 13, wherein said cable securing rungs include a lower portion and an upper portion wherein said upper portion and said lower portion define said strap passage and wherein said lower portion is coupled to said base plate.

15. The cable termination assembly of claim 14, further including a strap passing through said strap passage and wherein said strap passes through said strap passage substantially perpendicular to said longitudinal axis of said cable securing rung, and wherein said base plate and said cable securing rungs completely encircle said strap to prevent said strap from being accidently dislodged from said cable securing rungs, and wherein said strap is a self-engaging strap of hook and loop style thereby avoiding the mechanical damage to the cables that occurs with conventional nylon or plastic ratcheting cable ties.

16. The cable termination assembly of claim 1, further including a grounding attachment tab coupled to said base plate.

17. The cable termination assembly of claim 1, further including an escutcheon plate.

18. The cable termination assembly of claim 1 wherein said second group of cable securing rungs includes a first size of cable securing rung and a second size of cable securing rungs wherein the first size of cable securing rung is larger than the second size of cable securing rung, and wherein said first size of cable securing rung is located closest to the sides of said base plate, wherein said termination portion of said base plate is configured as the front of the base plate and the direct opposing side of the base plate from said termination plate is the rear side of said base plate.

19. The cable termination assembly of claim 18 wherein the cable termination assembly is configured such that any cables enter from the sides and are first secured to said first size of said cable securing rung in said second group of cable securing rungs.

20. The cable termination assembly of claim 19 wherein the cable termination assembly is configured to only allow any cables to enter from the sides due to the alignment of the second group of cable securing rungs.

\* \* \* \* \*